April 25, 1961 H. F. PARKER ET AL 2,981,203
CONVEYOR POWER CHAIN
Filed Jan. 5, 1959 2 Sheets-Sheet 1
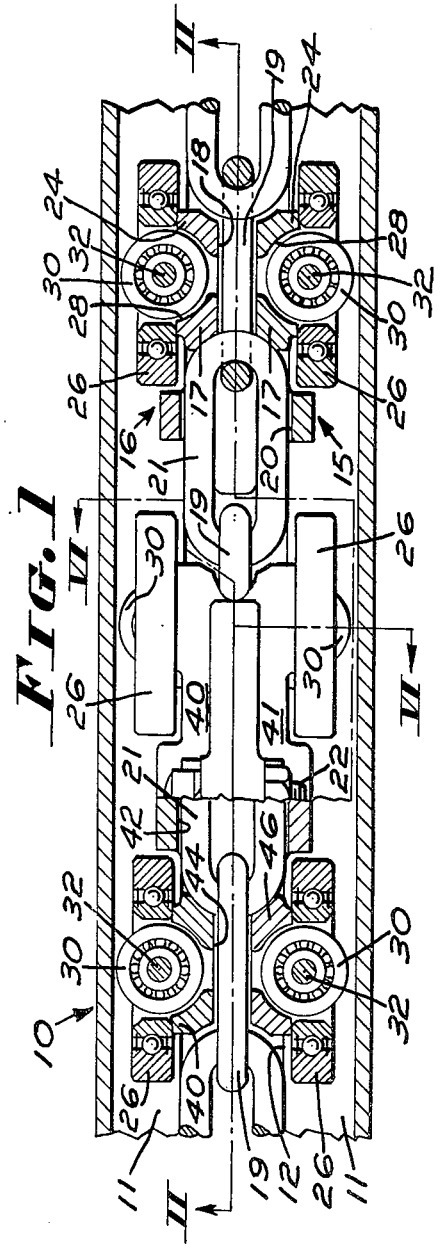
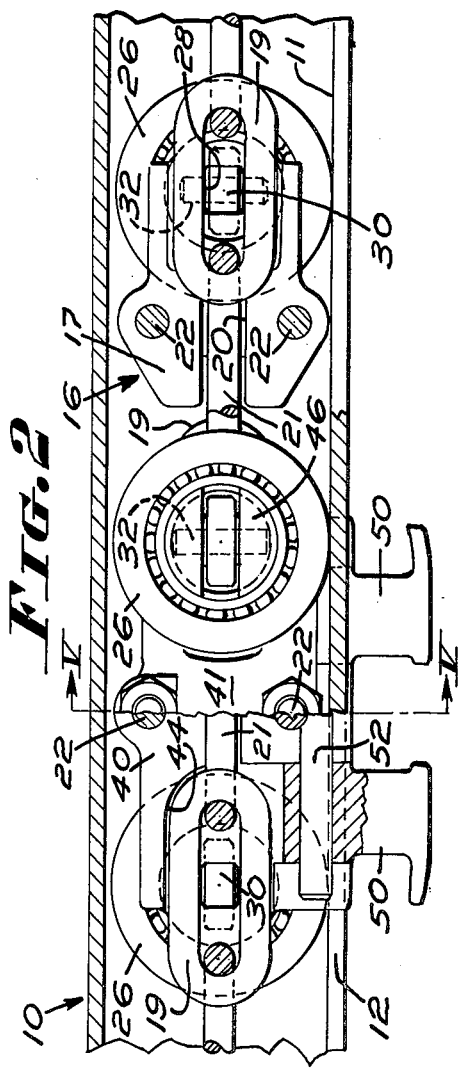
INVENTORS:
HUMPHREY F. PARKER
and ERFORD E. ROBINS
BY:
Beau, Brooks, Buckley & Beau,
ATTORNEYS.

April 25, 1961  H. F. PARKER ET AL  2,981,203
CONVEYOR POWER CHAIN

Filed Jan. 5, 1959  2 Sheets-Sheet 2

INVENTORS:
HUMPHREY F. PARKER
and ERFORD E. ROBINS
BY:
Beau, Brooks, Buckley & Beau,
ATTORNEYS.

United States Patent Office 2,981,203
Patented Apr. 25, 1961

2,981,203
CONVEYOR POWER CHAIN

Humphrey F. Parker, Buffalo, and Erford E. Robins, North Tonawanda, N.Y., assignors to Columbus McKinnon Chain Corporation, Tonawanda, N.Y.

Filed Jan. 5, 1959, Ser. No. 784,975

5 Claims. (Cl. 104—94)

This invention relates to conveyors in which power chains of the welded link type are provided with load carrying hangers or pick-up means for moving trolleys, trucks or other objects along trolley rails, tracks, floorways, or the like; for example as in manufacturing or warehousing operations. Such power chains include interspersed wheeled drive and guide units to pick up and drive the loads and to rollingly support the chain in the track system. This invention is particularly concerned with improvements in the construction of wheeled carriages for mounting on continuous chain strands of the welded link type.

One object of the invention is to provide an improved detachable means for forming wheeled drive and guide units in a welded link chain-powered conveyor, for use in conveyor systems as aforesaid.

Another object of the invention is to provide an improved carriage means for attachment to continuous strands of welded link type chain to provide wheeled guide links wherever desired throughout the length of the chain, without need for dismantling any parts of the chain.

Another object of the invention is to provide a novel wheeled carriage which may be added to or removed from a continuous chain strand as aforesaid for the purposes described; said carriage being simple in design; easy to manufacture and assemble; and rugged and inexpensive to maintain.

Other objects and advantages of the invention will become apparent from the following specification, and the accompanying drawing wherein:

Fig. 1 is a fragmentary top plan view partly in section, of a conveyor power chain having devices of the invention attached thereto provide both a drive link unit and a guide link unit;

Fig. 2 is a fragmentary side elevational view partially in section, taken on line II—II of Fig. 1;

Conveying systems of the type to which this invention relates include flexible power chains running in either overhead or underground trackways, having load pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12 to provide opposed track surfaces 11—11 upon which the power chain rollers run, so that the trackway is adapted for overhead conveyor use. However, the slot may be in the top or in either side wall of the track member, depending upon the relative position of the power chain and the work to be conveyed.

As stated hereinabove the invention contemplates a novel carriage which may be attached to standard type welded chain links to create wheeled drive link units and intermediate guide link units for an endless welded link chain. The carriage units are each composed of a pair of half-carriages which are designed to be fitted onto the chain at desired locations, and when fixed together thereon form guide units or drive and guide units which function as integral parts of the chain.

Figure 3:
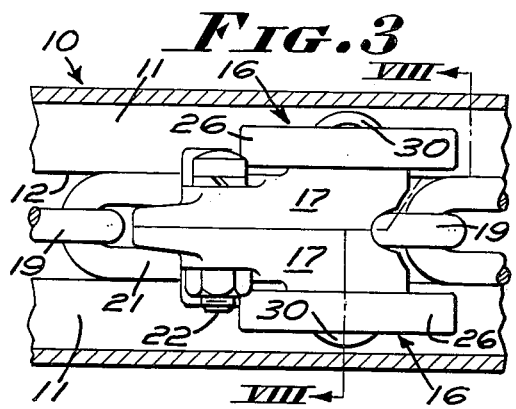
Fig. 3 is a top plan view of the guide link portion of Fig. 1.
Figure 4:
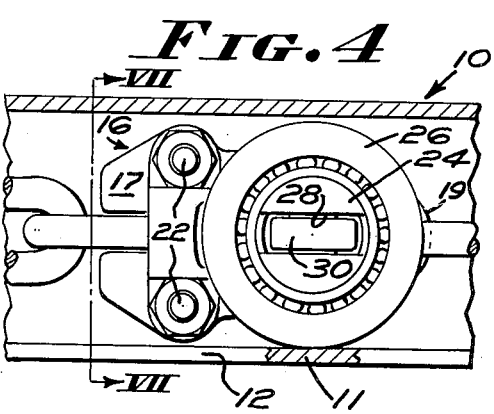
Fig. 4 is a side elevational view of the guide link of Fig. 3.
Figure 7:
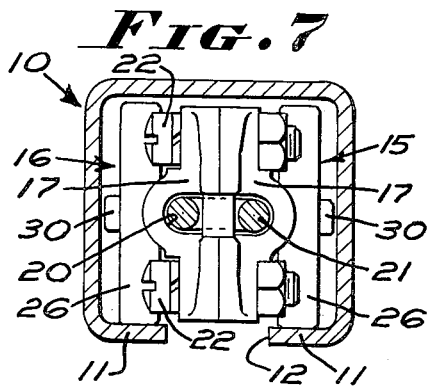
Fig. 7 is a view partially in section taken on line VII—VII of Fig. 4.
Figure 8:
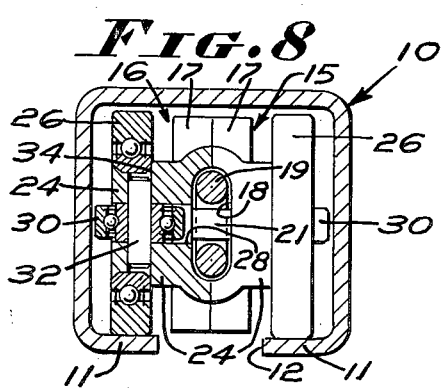
Fig. 8 is a view partially in section taken on line VIII—VIII of Fig. 3.

The guide unit, as seen in Figs. 1, 2, 3, 4, 7 and 8 comprises complementary right hand and left hand half-carriages 15, 16, each of which includes a body portion 17 formed with a central recess 18 into its inside wall to accommodate one-half of a vertical link 19 of welded chain, and a second recess 20 at one end thereof to receive a portion of an adjoining horizontal link 21 of the chain. The body portions 17—17 are bored transversely near the top and bottom thereof to receive assembly bolts 22, 22. Each half-carriage has a stub axle portion 24 formed on the outside wall of its body portion 17. The stub axles 24 are adapted to receive the inner races of vertically disposed ball bearing type wheels 26, and the outer ends thereof are slotted as indicated at 28 to receive smaller, horizontally disposed, guide wheels 30 which are held in place by pins 32 slip-fitted into openings 34 drilled vertically through the stub axles as shown. The horizontal guide wheels extend beyond the outer faces of the vertical guide wheels, and the two guide wheels thereby combine to provide rolling support for the power chain both vertically and horizontally. It will be readily apparent that the half-carriages may each be assembled and guide link units may be easily and conveniently formed on a welded chain simply by fitting complementary half-carriages to a vertical link of the chain and clamping them together as by means of the bolts 22, 22.

Figure 5:
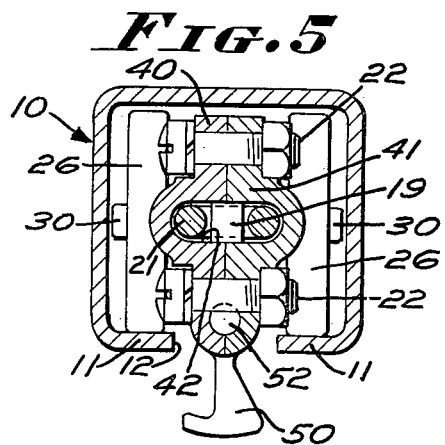
Fig. 5 is a sectional view taken on line V—V of Fig. 2.
Figure 6:
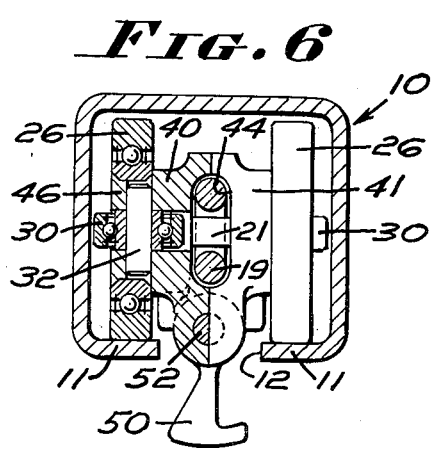
Fig. 6 is a view partially in section taken on line VI—VI of Fig. 1.

The carriage for the drive link unit of the invention illustrated in Figs. 1, 2, 5 and 6, is similar to the carriage for the guide unit hereinabove described but provides a four-wheeled carriage structure in order to stabilize the unit against rocking or twisting in the trackway as otherwise might occur as the unit first engages a stationary load for load pickup purposes. In the case of the drive unit, the mating cast metal body portions 40, 41 have central recesses 42 in their inner walls shaped to each receive one-half of a horizontal link 21 of the power chain, and recesses 44, 44 at each end thereof shaped to accommodate parts of each of the adjoining vertical links 19, 19 of the welded chain. The body portions 40, 41 have stub axles 46, 46 extending laterally at each end thereof, and vertical and horizontal guide wheels 26 and 30 respectively are mounted thereon in the same manner as in the guide unit structure. In this case the assembly bolts 22, 22 are located near the top and bottom edges of the carriage body portions, mid-way between their ends.

As indicated at 50—50, load pick up lugs may be simultaneously assembled on the carriage body as by means of pivot pin devices as indicated at 52; it being understood that the specific load pick up lug arrangement as shown herein forms no essential part of the present invention, and that in lieu thereof any other suitable load engaging device may be employed. Also, it will be understood that although only one form of the invention has been shown and described in detail, it will be apparent to those skilled in the art that the invention is not so limited but that various changes may be made

We claim:

1. A wheeled carriage for attachment to a welded link conveyor power chain comprising a pair of complementary cast metal body portions recessed vertically into their complementary surfaces to each accommodate one-half of a vertically disposed link of the welded link chain and horizontally to accommodate part of a horizontally disposed link of said chain, each body portion having a stub axle portion cast integrally therewith and extending outwardly therefrom and in the region of said body portions within which the vertical recesses are contained, wheels carried upon said axle portions, said wheels being of a diameter to project below said body portions to provide rolling support therefor, said body portions being provided with horizontal complemental bores therethrough in the region thereof containing said horizontally recessed portions thereof, and detachable assembly means within said bores holding said body portions clamped around said vertically disposed link of said chain.

2. A wheeled carriage for attachment to a welded link conveyor power chain comprising a pair of complementary cast metal body portions recessed vertically into their complementing surfaces to each accommodate one-half of a vertically disposed link of the welded link chain and horizontally to accommodate part of a horizontally disposed link of said chain, each body portion having a stub axle portion cast integrally therewith and extending outwardly therefrom and in the region of said body portions within which the vertical recesses are contained, wheels carried upon said axle portions, said wheels being of a diameter to project below said body portions to provide rolling support therefor, said stub axle portions being hollow, and guide wheels mounted internally of said stub axle portions but protruding therefrom beyond the first mentioned wheels and being journalled about vertical axes, said body portions being provided with horizontal complemental bores therethrough in the region thereof containing said horizontally recessed portions thereof, and detachable assembly means within said bores holding said body portions clamped around said vertically disposed link of said chain.

3. A wheeled carriage for attachment to a welded link conveyor power chain comprising a pair of complementary cast metal body portions recessed vertically into their complementing surfaces to each accommodate one-half of a vertically disposed link of the welded link chain and horizontally to accommodate part of a horizontally disposed link of said chain, each body portion having a stub axle portion cast integrally therewith and extending outwardly therefrom and in the region of said body portions within which the vertical recesses are contained, wheels carried upon said axle portions, said wheels being of a diameter to project below said body portions to provide rolling support therefor, said stub axle portions being hollow, and guide wheels mounted internally of said stub axle portions but protruding therefrom beyond the first mentioned wheels and being journalled about vertical axes, detachable assembly means holding said body portions clamped around said vertically disposed link of said chain.

4. A wheeled carriage for attachment to a welded link conveyor power chain comprising a pair of complementary body portions, said body portions in one end thereof being provided with vertical recesses within their complementing surfaces to accommodate one-half of a vertically disposed link of an associated welded link chain and having in the other end thereof horizontally disposed recesses in their complementing surfaces to accommodate part of a horizontally disposed link of said chain, such recesses being intersecting, with the horizontal recesses being of materially less vertical height than said vertical recesses, detachable assembly means holding said body portions in clamped engagement with each other, said means being in said other end of the body portions immediately adjacent to said horizontal recesses therein, stub axle portions rigid with said body portions in said one end thereof and projecting laterally outwardly therefrom, and supporting wheels carried upon said stub axle portions.

5. A wheeled carriage for attachment to welded link conveyor power chain comprising a pair of complementary body portions, said body portions in one end thereof being provided with vertical recesses within their complementing surfaces to accommodate one-half of a vertically disposed link of an associated welded link chain and having in the other end thereof horizontally disposed recesses in their complementing surfaces to accommodate part of a horizontally disposed link of said chain, such recesses being intersecting, with the horizontal recesses being of materially less vertical height than said vertical recesses, detachable assembly means holding said body portions in clamped engagement with each other, said means being in said other end of the body portions immediately adjacent to said horizontal recesses therein, stub axle portions rigid with said body portions in said one end thereof and projecting laterally outwardly therefrom, supporting wheels carried upon said stub axle portions, said stub axle portions being hollow and receiving guide wheels therewithin, means fixing said guide wheels within said stub axle portions for rotation about vertical axes with said guide wheels protruding from said stub axle portions beyond the confines of said supporting wheels.

References Cited in the file of this patent

UNITED STATES PATENTS

| 2,725,973 | King | Dec. 6, 1955 |

FOREIGN PATENTS

| 738,491 | Germany | Aug. 18, 1943 |